United States Patent [19]

Kay

[11] Patent Number: 5,177,368
[45] Date of Patent: Jan. 5, 1993

[54] METHOD AND DEVICE FOR CORRUPTING BAR CODES ON ARTICLES PRIOR TO PACKING

[75] Inventor: Stephen A. Kay, Luton, England
[73] Assignee: The Coca-Cola Company, Atlanta, Ga.
[21] Appl. No.: 779,239
[22] Filed: Oct. 18, 1991
[51] Int. Cl.$^5$ .............................................. G06K 7/10
[52] U.S. Cl. ...................................... 250/566; 235/385
[58] Field of Search ............... 250/271, 223 R, 234, 250/235, 236, 566; 235/462, 494, 383, 385; 53/494, 53, 54, 65

[56] References Cited

U.S. PATENT DOCUMENTS

| | | |
|---|---|---|
| 4,573,409 | 3/1986 | Clar et al. |
| 4,669,611 | 6/1987 | Flaherty. |
| 4,827,114 | 5/1989 | Blachon. |
| 4,850,488 | 7/1989 | Humbert. |
| 4,976,089 | 12/1990 | Reichelt ............................. 53/53 |
| 5,008,519 | 4/1991 | Cunningham et al. ............ 235/383 |

Primary Examiner—David C. Nelms
Assistant Examiner—K. Shami

[57] ABSTRACT

A method and device for corrupting bar codes on articles and for packing the articles conveys the articles from an orienter to a packer. Each of the articles has a bar code which is positioned by the orienter to face a marking device. The orienter can be a linear device or a carousel device with a rotatable table. The marking device is either an ink jet or laser which will place a pattern through the bar code of each article. The packer will place a plurality of the articles in an open ended receptacle such as a carton. Some of the bar codes will be visible through the open end of the receptacle. Due to the mark through these bar codes, however, these exposed bar codes cannot be read by an optical scanner.

22 Claims, 2 Drawing Sheets

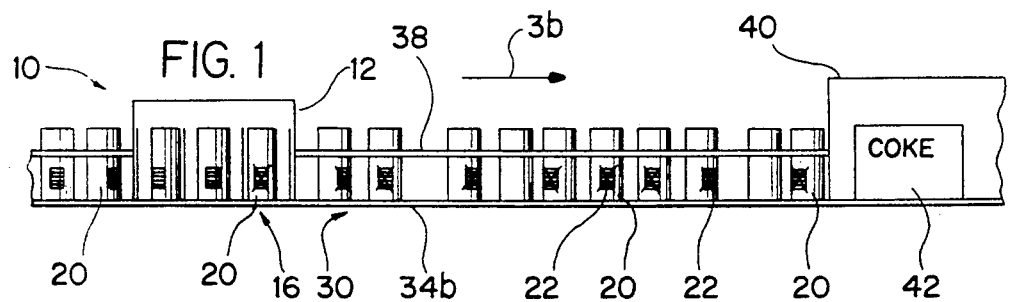
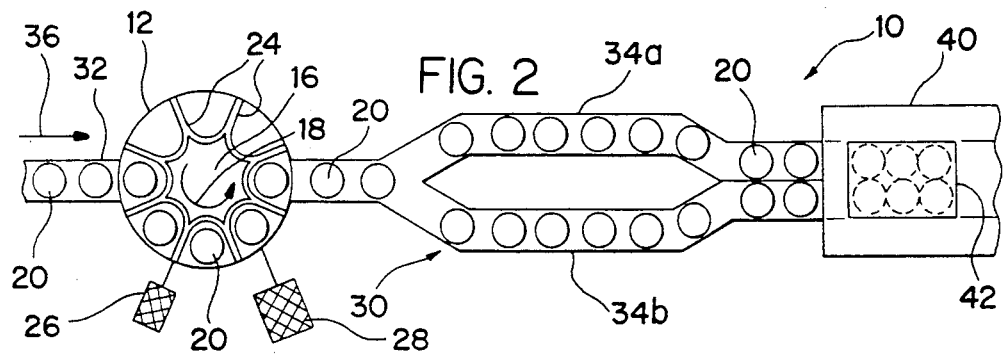
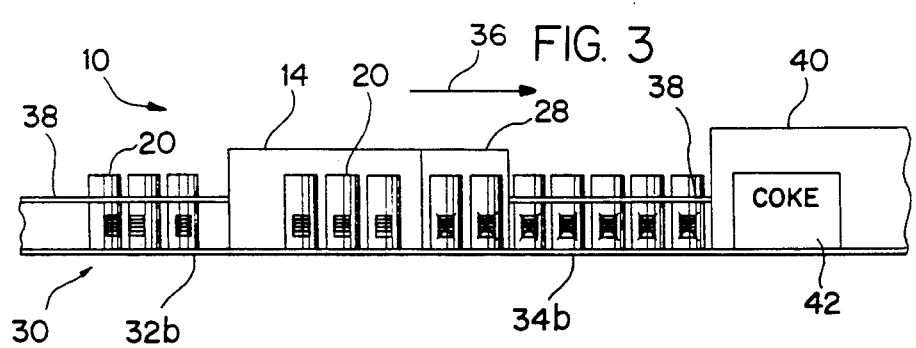
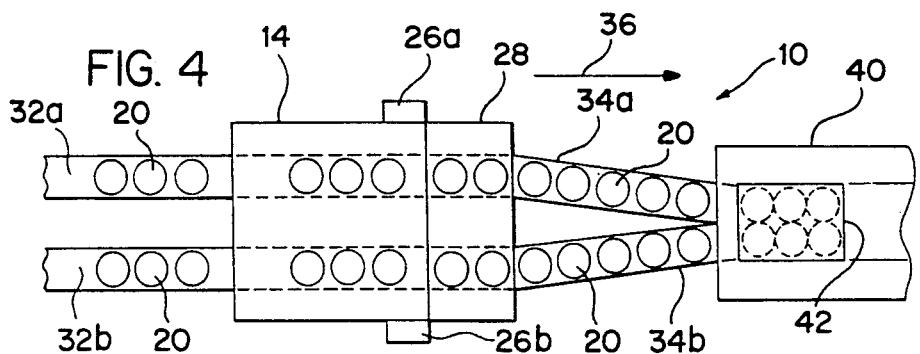

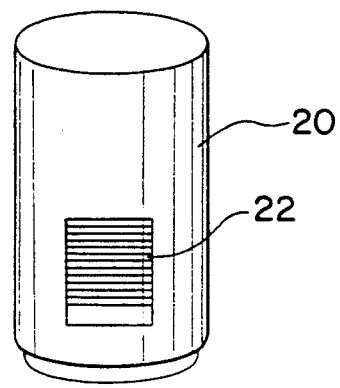
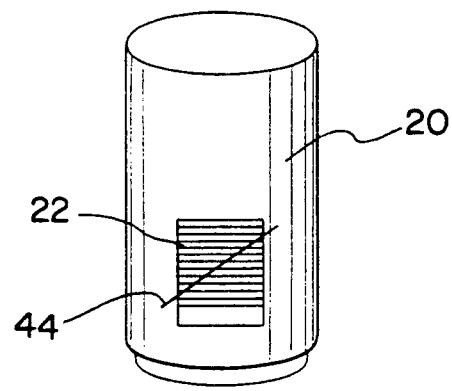
FIG. 5            FIG. 6
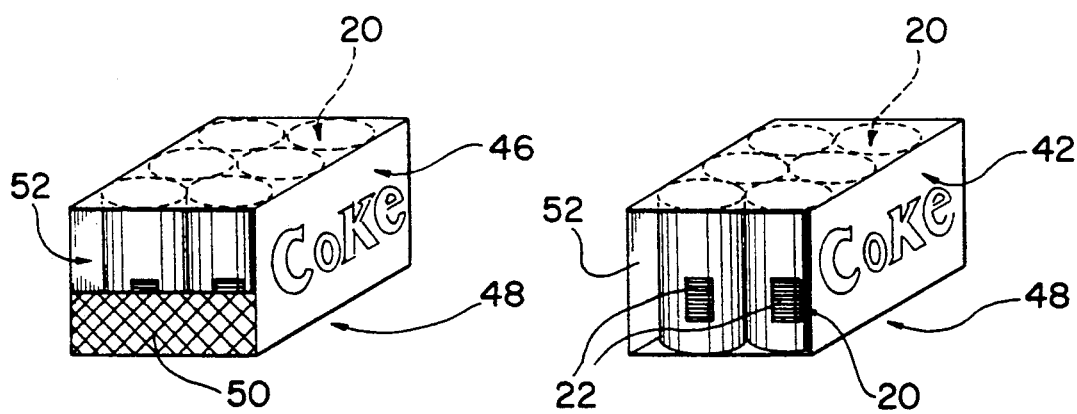
FIG. 7
PRIOR ART
FIG. 8

METHOD AND DEVICE FOR CORRUPTING BAR CODES ON ARTICLES PRIOR TO PACKING

BACKGROUND OF THE INVENTION

1. Field of the Invention

The present invention relates to a method and device for corrupting bar codes on a plurality of articles which are packaged in a receptacle. Either an ink jet or laser will place a mark through the bar code of each article such that this bar code can no longer be optically scanned.

2. Description of the Background Art

Many articles are now provided with bar codes which can automatically be read. However, when these individual articles are packaged together, it is often a problem that the bar code for a single article is read instead of a bar code for a package. Therefore, an inaccurate count of the articles will be had.

For example, soda cans can be put into open-ended six packs as seen, for example, in FIG. 8 of the instant application. These cans 20 will have exposed bar codes 22 through the open end 52 of the carton 42. The carton 42 will also have a bar code 48 indicating the amount and price for six items. When a retailer, for example, scans carton 42, it is often the case that the exposed bar code 22 on the can 20 will be read instead of the bar code 48 on the bottom of the carton 42. Therefore, a consumer will only be charged for a single soda instead of a six pack. Further, the inventory for the retailer will be incorrect.

In order to solve this problem, it has been proposed to add a bar code cover 50 on carton 46 as seen in FIG. 7 of the instant application. While this arrangement will prevent a scanner from reading the individual bar codes 22 on the cans, this end cover 50 adds considerable expense to the cost of the carton 46.

As another alternative, it has been proposed to have two inventories of cans. One inventory will have a bar code 22 indicating a single article whereas other cans will have bar codes indicating a six pack. These cans having six pack bar codes will only be packaged in cartons 42. In this manner, either the bar code 48 on the carton 42 or the bar code 22 on the individual cans will be read. Either reading will indicate that a six pack of articles is present. In fact, the bar code 48 on the bottom of the carton 42 can be omitted in this arrangement.

However, this dual bar code arrangement has several drawbacks. For example, if a consumer breaks open a six pack and takes a single can to the register, the scanner will indicate that a six pack is being purchased. Not only can the consumer be overcharged, but the retailer's inventories will be inaccurate. Also, the use of dual cans having either single item or plural item bar codes increases the needed inventories, requires different can decorations for each product and increases the filling line requirements. Specifically, either the filling lines handle only single or multipack cans thereby necessitating certain control devices or two separate filling lines must be used. Therefore, this arrangement is logistically more complicated and is more expensive than an arrangement using a can with only a single bar code.

SUMMARY OF THE INVENTION

Accordingly, it is a primary object of the present invention to provide an inexpensive method and apparatus for corrupting bar codes on articles prior to packing.

It is another object of the present invention to provide a method and apparatus which can be used with open-ended receptacles while assuring scanning of only the bar code on the receptacle.

It is a further object of the present invention to provide a method and device which avoids the need for dual filling lines or extensive controls of the filling lines.

Another object of the present invention is to provide a method and device which avoids the need for plural empty article inventories.

Yet another object of the present invention is to provide a method and device which will assure proper bar code reading and which will alert a retailer if a consumer opens a receptacle such that the consumer will not be overcharged and the retailer's inventories can accurately be maintained.

A further object of the present invention is to provide a device and method which can easily be incorporated into existing packaging lines.

Still another object of the present invention is to provide a method and device which is easy and inexpensive to use and maintain.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become fully understood from the detailed description given hereinbelow and the accompanying drawings which are given by way of illustration only, and thus are not limitative of the present invention, and wherein:

FIG. 1 is a side view of a first embodiment of the device for corrupting bar codes on articles and for packaging the articles of the present invention;

FIG. 2 is a plan view of the first embodiment of the present invention;

FIG. 3 is a side view of the second embodiment of a device for corrupting bar codes on articles and for packaging the articles of the present invention;

FIG. 4 is a plan view of the second embodiment of the present invention;

FIG. 5 is a side view of an article with a bar code;

FIG. 6 is a side view of an article having a corrupted bar code;

FIG. 7 is a perspective view of a prior art receptacle having an end cover; and

FIG. 8 is a perspective view of an open ended receptacle.

DETAILED DESCRIPTION OF THE PREFERRED EMBODIMENTS

Referring in detail to the drawings and with particular reference to FIG. 1, a device 10 for corrupting and conveying articles 20 is shown. These articles 20 in the instant invention are soda cans but it should be understood that many different types of articles can be used. A bar code 22 will be on each of the articles 20. An example of this article 20 is shown in FIG. 5. As shown in FIG. 6, the bar code 22 on these articles 20 can be corrupted with a mark 44. While FIG. 6 schematically indicates a solid line 44, it should be understood that a noncontinuous mark can be made to corrupt bar 22. For example, a dot pattern can be applied by an ink jet as will be described below. This dot pattern can be a single row or plural rows of dots which corrupt the bar code 22 to prevent further optical reading. If plural rows of dots are used, they can be spaced so closely together that they appear as a single line. On the other hand, a crossed line having an "X" shape can be used for the dot pattern.

Alternatively, a laser can be used to apply mark 44 as will be described below. While a continuous line 44 is shown in FIG. 6, several discrete marks can be applied by the laser to the bar code. Sufficient marks will be made to prevent further optical scanning but will not render the can 20 unsightly. While many different configurations can be used for mark 44, it should be clear that this mark will simply prevent further optical reading of the bar code 22.

In order to corrupt the bar codes 22 on the articles 20, the present invention will first feed the articles to one of two types of orienters as will be discussed below. Of course, many different forms of orienter mechanisms can be used. As seen in FIGS. 1 and 2, the orienter 12 of the first embodiment is a carousel type device. This orienter 12 is provided with a rotatable table 16 movable in the direction indicated by arrow 18. Articles 20 can be placed in holders 24 on this table 16. The articles 12 will be rotated past an optical scanner 26. This orienter 12 will move the articles 20 such that their bar codes 22 face outwardly. The scanner 26 will check to ensure that the bar codes are properly located.

The orienter 12 will continue to rotate the articles 20 past the optical scanner 26 to the means 28 for marking. This means 28 for marking can be an ink jet or a laser as noted above. If an ink jet is used, a mark 44 is drawn through the bar code. On the other hand, a laser will place a mark 44 through the bar code 22. In the United States when corrupting bar codes 22 on cans, the can decoration is placed directly on the metal of the can 20. It may therefore be desirable in the U.S. to use a laser while an ink jet may be preferred in Europe because of the use of an undercoating on the can.

It should be understood that many different arrangements can be used for placing a mark 44 through the bar code 22. Once the means 28 places this mark 44 through the bar code 22, these bar codes 22 are no longer optically readable.

A conveyor 30 is provided for moving the articles 20 through the device 10 in the direction indicated by arrow 36. Side rails 38 can be provided on this conveyor 30. This conveyor 30 can have an upstream section 32 for feeding the articles 20 to the orienter 12. Downstream from the orienter 12, the conveyor section 34 can split into a first and second side 34a, 34b. In this manner, dual rows of articles 20 are fed to packer 40. The packer 40 can then readily package the articles into a receptacle 42 such as a six pack. It should be understood that any number of rows can be used to feed articles to the packer 40 or that the packer can have a single infeed line which then sorts articles into various rows. While two rows of articles are shown, it should be understood that any number of rows or a single row can be formed in receptacle 42. Regardless of the number of rows, the packer 40 will place a plurality of articles 20 into a receptacle 42.

Turning now to the second embodiment shown in FIGS. 3 and 4, a linear type of orienter 14 is used. In this arrangement, the upstream conveyor has two sections 32a and 32b which feed articles 20 to the orienter 14. As the articles are fed through this orienter 14, they will be moved such that their bar codes face a particular direction. For example, the bar codes can face outwardly. Two optical sensors 26a and 26b can be provided for reading bar codes on each line. Alternatively, a single scanner can be positioned between the two lines if, for example, the bar codes are to face inwardly. It should be understood that the exact orientation of the bar codes on the articles can be changed. It is merely important that each article is consistently positioned by the orienter 14.

From this orienter 14, the articles 20 will be fed to the means 28 for marking. Similarly to the first embodiment, this means 28 for marking can be an ink jet or a laser.

Downstream from the means 28 for marking are the first and second conveyor lines 34a and 34b. These lines will feed the articles to the packer 40. Similarly to the above-discussed arrangement, a single line or any number of lines of articles can be fed to the packer 40.

As seen in FIG. 8, the receptacle 42 will have open ends 52. While the rear end of receptacle 42 is not shown in this figure, it can be appreciated that this end is also open. The articles 20 which are placed in this receptacle 42 shown in FIG. 8 do not have corrupted bar codes. It should readily be understood that when using the instant device, these bar codes 22 will have a mark 44 drawn therethrough. In this manner, when a consumer purchases a six pack, for example, the retailer will scan the receptacle 42. The scanner will only read bar code 48 on the bottom of the receptacle 42 because the bar codes 22 on each individual can will be corrupted by mark 44. In this manner, the instant device 10 prevents further optical reading of the bar codes 22. Dual inventories of bar codes and dual filling lines are avoided. Moreover, it is unnecessary to modify the can design when using the instant invention.

The instant invention further includes the method for corrupting the bar codes on the articles and for packaging the articles. As described with reference to the device 10, this method will involve providing a plurality of articles 20 each having a bar code 22. These articles will then be conveyed in a predetermined direction by conveyor 30. An orienter 12 or 14 will then position the bar codes at a predetermined location. The means 28 (ink jet or laser) will directly mark through the bar code. The articles will be packaged by a packer 40 in a receptacle 42 such that the bar codes of at least some of the articles will be visible. Specifically, the end articles 20 in the open ended receptacle 42 can be visible if they are rotated in the proper direction. Regardless of which bar codes 22 on articles 20 are visible in receptacle 42, they cannot further be optically read because of the mark 44 placed thereon by the means 28. In other words, optical reading of the bar codes is prevented as a result of the marking such that the bar codes which are visible in receptacle 42 are unreadable by an optical scanner.

Because the means 28 directly marks the bar codes 22, it is unnecessary to provide a flap (such as bar code cover 50) or any other obstruction device on the package. Therefore, the cost of the receptacle is kept low. Misreading of the package of articles is prevented and inventory counts can more accurately be maintained with the instant device and method.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for corrupting bar codes on articles and for packaging the articles comprising the steps of:
   providing a plurality of articles, each of the articles having a bar code thereon;
   conveying the articles in a predetermined direction;
   orienting each of the articles to position the bar code at a predetermined location;
   directly marking through the bar code on each article;
   packaging a plurality of articles in a receptacle with the bar codes of at least some of the articles being visible outside the receptacle; and
   preventing optical reading of the bar code of each article as a result of the step of marking, the bar codes which are visible in the receptacle being unreadable by an optical scanner.

2. The method as recited in claim 1, wherein the step of marking comprises placing a pattern through the bar code of each of the articles.

3. The method as recited in claim 2, wherein the step of marking comprise drawing a dot pattern through the bar code of individual articles with an ink jet.

4. The method as recited in claim 2, wherein the step of marking comprises planning the pattern through the bar code of individual articles with a laser.

5. The method as claimed in claim 1, wherein the articles are cans and the receptacle is a carton and wherein the step of packaging comprises placing six cans in the carton.

6. The method as recited in claim 5, wherein the carton has open ends and wherein cans adjacent at least one open end have their bar codes visible through the open end, the step of marking rendering the bar codes of the cans adjacent the open ends optically unreadable even though the bar codes of the cans are visible through the open end.

7. A can having a marked bar code produced in accordance with the steps of claim 6.

8. An article having a marked bar code produced in accordance with the steps of claim 1.

9. The method as recited in claim 1, wherein the step of conveying comprises moving each article through an orientation device, past one of an ink jet and laser and to a packer, the one of the ink jet and laser being used in the step of marking and the packer being used in the step of packaging.

10. The method as recited in claim 9, further comprising the step of optically scanning after the step of orienting and before the step of marking to check the location of the bar code on each of the articles.

11. The method as recited in claim 9, wherein the step of orienting comprises linearly moving the articles through the orientation device and moving each article in the orientation device to the predetermined location such that each article will face the one of the ink jet and laser.

12. The method as recited in claim 11, wherein the step of conveying comprises the step of moving the articles in two lines through the orientation device and to the packer whereat two rows of articles are packaged in the receptacle.

13. The method as recited in claim 9, wherein the step of orienting comprises rotating the articles on a rotatable table while moving each article to the predetermined located such that each article will face one of the ink jet and laser.

14. The method as recited in claim 13, wherein the steps of optically scanning and marking are carried out while the articles are on the rotatable table.

15. The method as recited in claim 13, wherein the step of conveying comprises moving the articles in two lines from the rotatable table to the packer whereat two rows of articles are packaged in the receptacle.

16. A device for corrupting bar codes on articles and for packing the articles, each of the articles having a bar code thereon, the device comprising:
   a conveyor for conveying the articles in a predetermined direction;
   means for directly marking through a bar code of each article;
   an orienter for arranging each article such that the bar code thereon faces the means for marking; and
   a packer for placing the articles in a receptacle with the bar codes of at least some of the articles being visible outside the receptacle;
   the conveyor conveying the articles from the orienter to the packer and the bar codes on the articles marked by the means for marking being unreadable by an optical scanner such that bar codes visible in the receptacle are prevented from being optically read.

17. The device as recited in claim 16, further comprising dual conveyor lines before the packer such that two rows of articles are fed to the packer and two rows of articles are packaged in the receptacle, the receptacle being an open ended carton and the articles being cans, the packer placing six cans in the carton.

18. The device as recited in claim 16, wherein the means for directly marking comprises an ink jet for drawing a dot pattern through the bar code of each article.

19. The device as recited in claim 16, wherein the means for directly marking comprises a laser for placing a pattern through the bar code of each article.

20. The device as recited in claim 16, further comprising an optical scanner for checking the orientation of the articles before the articles reach the means for marking.

21. The device as recited in claim 16, wherein the orienter comprises a device through which two lines of articles are linearly conveyed, the articles being moved such that their bar codes face the means for marking.

22. The device as recited in claim 16, wherein the orienter comprises a rotatable table which moves each article so that the bar code thereon will face the means for marking, the means for marking being adjacent the rotatable table.

* * * * *

UNITED STATES PATENT AND TRADEMARK OFFICE
CERTIFICATE OF CORRECTION

PATENT NO. :   5,177,368
DATED      :   January 5, 1993
INVENTOR(S) :  Stephen A. Kay It is certified that error appears in the above-identified patent and that said Letters Patent is hereby corrected as shown below:

Column 4,
Claim 4
    Line 2, change "planning" to --placing--
Column 5,
Claim 13
    Line 4, change "located" to --location--

Signed and Sealed this

Sixteenth Day of November, 1993

Attest:

BRUCE LEHMAN

Attesting Officer

Commissioner of Patents and Trademarks